July 19, 1927.
R. S. GEHLERT
1,636,179
COFFEE URN
Filed April 4, 1925
Fig. 1.
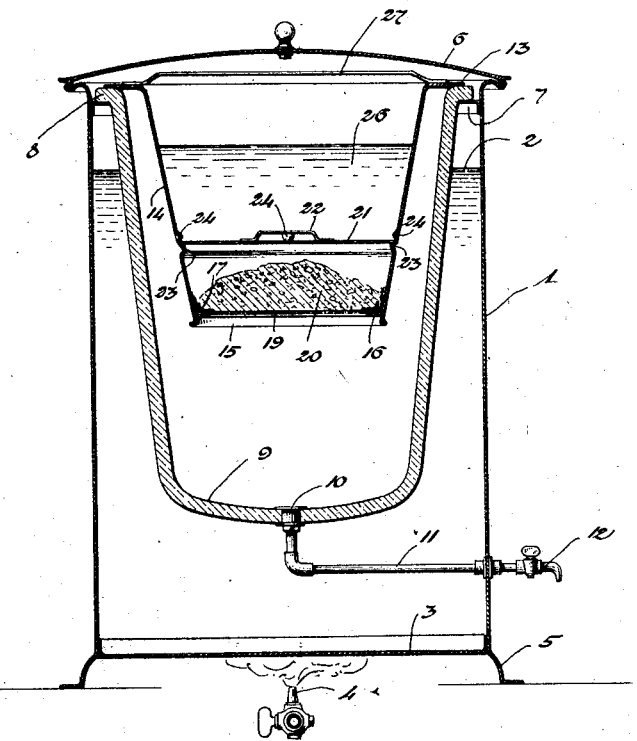
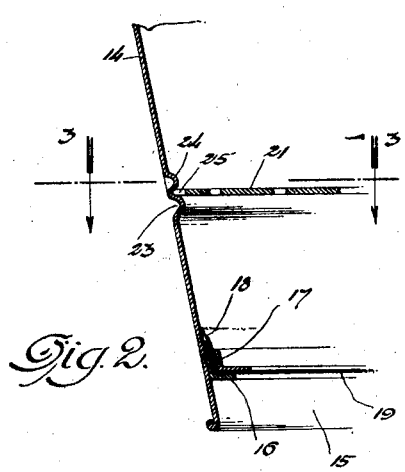
Fig. 2.
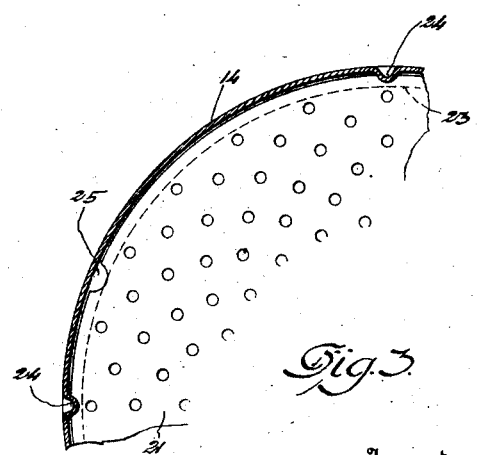
Fig. 3.
Inventor:
Richard S. Gehlert
By
Attorneys Patented July 19, 1927.

1,636,179

UNITED STATES PATENT OFFICE.

RICHARD S. GEHLERT, OF DETROIT, MICHIGAN.

COFFEE URN.

Application filed April 4, 1925. Serial No. 20,668.

This invention relates to coffee urns and and my invention aims to provide a coffee urn in which coffee may be expeditiously and economically made. An ordinary percolator requires considerable time for the essence to be extracted from the coffee and to save this time I have devised an urn in which ground coffee may be placed and boiling or scalding water poured thereon to immediately provide a quantity of the coffee for immediate use, the urn including a heated water receptacle by which the made coffee may be kept warm.

My invention further aims to provide a simple, durable, and inexpensive coffee urn for restaurant and hotel use, the urn being constructed so that it may be at all times retained in a sanitary condition.

The construction entering into my invention will be hereinafter specifically described and then claimed, and reference will now be had to the drawing, wherein Figure 1 is a vertical sectional view of the urn;

Fig. 2 is an enlarged detail sectional view of a portion of the coffee holder, and Fig. 3 is a horizontal sectional view of the same, taken on the line 3—3 of Fig. 2.

In the drawing, the reference numeral 1 denotes a cylindrical casing or receptacle adapted to contain a body of water 2 and the bottom wall 3 of the receptacle is adapted to be heated by any suitable heating apparatus, for instance a gas burner 4. It is obvious that the receptacle 1 may be supported by legs 5 or any suitable means providing clearance for the heater under the bottom wall 3 of the receptacle.

The upper end of the receptacle is adapted to be closed by a suitable lid or cover 6 and adjacent the open end of the receptacle there is an exterior annular ledge or flange 7 for the outturned rim 8 of the coffee container 9, said container being preferably made of a vitreous material and suspended centrally of the receptacle 1, so that the greater part of the container will be in the body of the heated water 2.

The bottom of the container 9 is concave so that the contents thereof may drain to an outlet connection 10 axially of the container, said outlet connection having an outlet pipe 11 extending through the side wall of the receptacle 1 and provided with a conventional form of faucet 12. It is obvious that the outlet pipe 11 will also be heated by the body of water 2.

The outturned rim 8 of the container 9 provides a support for the outturned rim 13 of an inverted frusto-conical shaped holder 14 having an open bottom 15. The open end 15 of the holder 14 is located in the middle portion of the container 9 and set in from the open end 15 of the holder is a removable supporting ring 16 which co-operates with a detachable ring 17 for holding the marginal edges 18 of a strainer 19, preferably made of one or more pieces of cheese-cloth or a like fabric. The strainer 19 is adapted to support coffee grounds 20 and this ground coffee is retained in the lower part of the holder 14 by a perforated partition 21 detachably mounted in the holder 14. The partition 21 has a handle 22 and the marginal edges of said partition are adapted to rest on an annular inwardly pressed bead 23 of the holder 14. The wall of the holder, above the bead 23, is inwardly pressed to provide a plurality of retaining lugs 24 and the edge of the partition is notched, as at 25, so that said partition may be placed downwardly over the lugs 24 and then partially rotated to place the edge of the partition under the retaining lugs. This will prevent the ground coffee 20 from raising the partition 21 and said partition will prevent the coffee from floating to the surface of a body of hot water 26 placed in the holder 14. The holder 14 has a suitable handle 27 so that it may be easily removed from the container 9.

In practice, boiling or scalding water is poured into the holder 14 on the ground coffee 20 and the hot body of water immediately starts to seep through the ground coffee and accumulates in the bottoms of the container 9 as made coffee. This made coffee will be kept in a warm condition by the heated body of water 2. After the essence has been extracted from the ground coffee 20 the holder 14 can be easily removed, then the partition 21, and finally the rings 16 and 17 between which are sandwiched the marginal edges 18 of the strainer 19. The detachable ring 17 has its lateral flange of less diameter than the lateral flange of the removable ring 18 to facilitate separating the strainer rings when the strainer fabric is to be cleaned or renewed.

It is thought that the operation and utility of the urn will be apparent without further description, and while in the drawing there is illustrated a preferred embodiment of my invention, it is to be understood that the structural elements are susceptible to such changes as are permissible by the appended claim.

What I claim is:

A coffee urn comprising a receptacle adapted to contain heated water, a vitreous coffee container suspended in said receptacle, a coffee holder suspended in said container, a strainer forming the bottom of said holder, a peripheral bead struck inwardly from the wall of said holder, spaced lugs formed on the inner wall of said holder and above said bead, a perforated partition adapted to rest on said bead, said partition having marginal notches adapted to pass said lugs.

In testimony whereof I affix my signature.

RICHARD S. GEHLERT.